March 14, 1961  J. C. SANDERS  2,974,483
ACCELERATION CONTROL FOR GAS TURBINE ENGINES
WITH COMPRESSOR SURGE LIMITING
Filed Sept. 28, 1956  2 Sheets-Sheet 1

INVENTOR
JOHN C. SANDERS
ATTORNEYS

United States Patent Office 2,974,483
Patented Mar. 14, 1961

2,974,483

ACCELERATION CONTROL FOR GAS TURBINE ENGINES WITH COMPRESSOR SURGE LIMITING

John C. Sanders, 2500 Derbyshire Road, Cleveland Heights, Ohio

Filed Sept. 28, 1956, Ser. No. 612,900

1 Claim. (Cl. 60—39.28)

(Granted under Title 35, U.S. Code (1952), sec. 266)

The invention described herein may be manufactured and used by or for the Government of the United States of America for governmental purposes without the payment of any royalties thereon or therefor.

The present invention relates to an acceleration control system and more particularly to an acceleration control system for a gas turbine engine that utilizes the compressor stall or surge limits of a gas turbine engine to set the engine fuel flow that will provide maximum acceleration.

There are many gas turbine engine installations that require an acceleration control system that will set the engine fuel flow so as to produce the highest acceleration that will not cause compressor stall or surge. One such installation is in combat aircraft wherein maximum acceleration is desired in order that speedy approaches and retreats can be made from enemy aircraft. Commonly used acceleration controls provide a schedule of fuel flow against some engine output variable, such as compressor discharge total pressure or a combination of engine speed and compressor inlet pressure. This schedule sets a maximum fuel flow that at the particular value of the engine output variable provides the best acceleration. If a command to accelerate, in the form of an increase in fuel flow, exceeds a scheduled fuel flow, the schedule takes command and supplies the scheduled fuel flow to the engine. The commonly used acceleration controls have the classical disadvantages of a schedule or open loop control. First, a schedule that is correct for all foreseeable environments, such as altitude, flight speed, temperature and fuel density, must be established. Then the control must have sensors to continually monitor these environmental conditions. The schedule, which is a multidimensional mathematical surface, must be incorporated in the control in the form of three-dimensional cams, servo-driven, nonlinear potentiometers, or function-generating circuits. Such a system is so complicated that existing controls do not schedule for all important environments. Second, as the engine is used it deteriorates, causing a gradual change in the fuel flow required for acceleration. Schedule controls do not account for this shift in engine characteristics. Third, each of a series of supposedly similar engines have acceleration characteristics sufficiently different that scheduled controls must have adjustments made after assembly on the engine.

The present system is an acceleration control that is used in conjunction with a schedule or open loop control to set the engine fuel flow for maximum acceleration. Upon command from a human operator or a supervising device, during acceleration periods, the present control system automatically tests the gas turbine engine to determine how close to the engine compressor stall or surge limit the schedule control is setting the fuel flow. The present control then adjusts the scheduled fuel flow to bring the gas turbine engine to the verge of stall or surge. Thus, this control seeks the engine surge and stall limits rather than the maximum acceleration; however, in many engines the maximum acceleration is not materially greater than the acceleration obtained at the verge of stall.

Since the present control tests the gas turbine engine under environmental conditions it automatically corrects the scheduled fuel flow to compensate for deterioration of the engine, variation in installations, and variation in environment.

Accordingly, an object of the present invention is the provision of an acceleration control system that gives maximum acceleration of a gas turbine engine regardless of engine environmental conditions.

Another object is to provide an acceleration control system for a gas turbine engine that tests the engine for stall and surge and sets the engine fuel flow such that the engine is brought to the verge of stall.

A further object of the invention is the provision of an acceleration control system for a gas turbine engine that operates in conjunction with a scheduled control to set the engine fuel flow for maximum acceleration.

Still another object is to provide an acceleration control system for a gas turbine engine that operates with a scheduled acceleration if the scheduled fuel flow is providing maximum acceleration and if not readjusts the scheduled fuel flow to obtain maximum acceleration.

A still further object is the provision of an acceleration control system for a gas turbine engine that operates in conjunction with a scheduled acceleration control system and which tests the engine to ascertain if the scheduled control is too close or too far from the stall and surge limit of the engine and readjusts the scheduled control to optimum control.

Other objects and many of the attendant advantages of this invention will be readily appreciated as the same becomes better understood by reference to the following detailed description when considered in connection with the accompanying drawings wherein.

Figure 1:
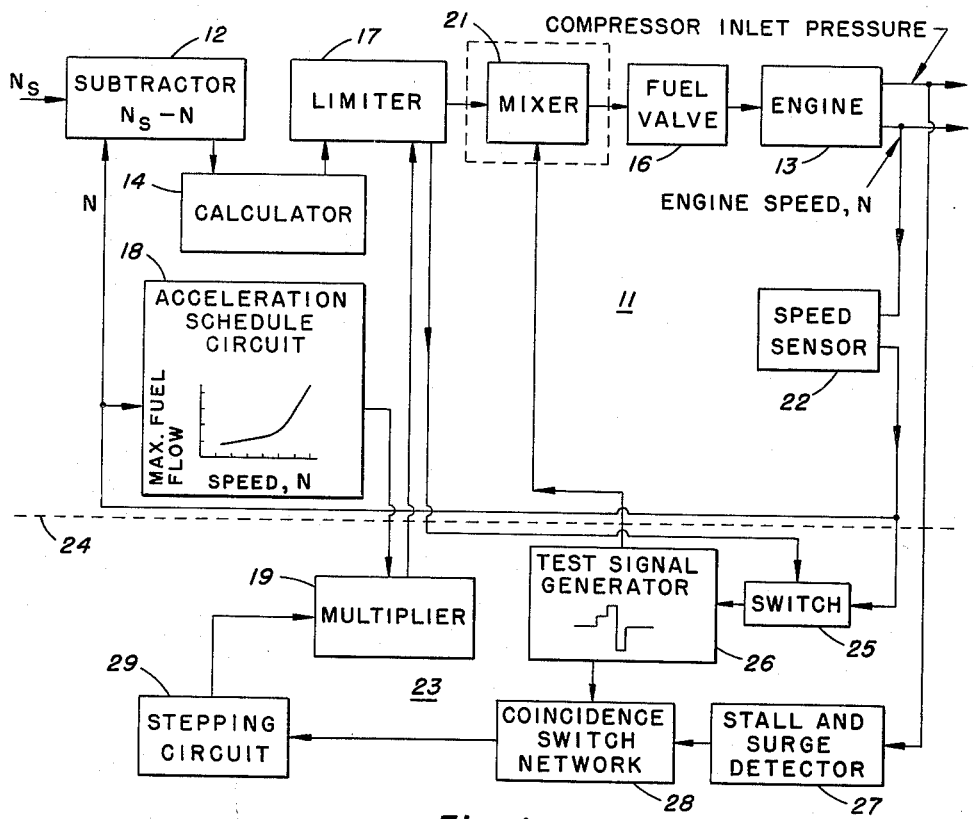
Fig. 1 shows a block diagram of a preferred embodiment of the invention.

Referring now to the drawings there is shown in Fig. 1 (which illustrates a preferred embodiment) a conventional scheduled acceleration control system 11 comprising a subtractor 12 which produces an output signal that is the difference between an input command signal $N_s$, which is from a human operator or a supervising device, and a speed signal N which is a function of the actual speed of the engine 13 that is being controlled. The difference or error output signal from subtractor 12 is fed to calculator 14 which converts the error signal into a command suitable signal that normally operates engine fuel valve 16 unless the scheduled limit is reached. Subtractor 12 and calculator 14 thus provide a command signal means. In the conventional scheduled acceleration control system, limiter 17 would limit the output from calculator 14 to a value not exceeding the scheduled value from acceleration scheduled circuit 18, the latter circuit being the component in which the scheduled information is set. However, in the disclosed modification of the scheduled circuit, limiter 17 limits the output from calculator 14 to a value not exceeding that established by multiplier 19. Also, in the conventional scheduled circuit the output of limiter 17 would directly control fuel valve 16 which in turn would control the flow of fuel and thus the speed and acceleration of engine 13; however, in the present system, mixer 21 has been interposed between limiter 17 and fuel valve 16, the operation of which will be explained infra. The speed N of engine 13 is sensed by speed sensor 22 and a signal corresponding thereto is transmitted from sensor 22 to subtractor 12. The auxiliary control circuit 23 of the present invention that contains the units that are combined with conventional control system 11 is shown, with the exception of mixer 21, below dotted line 24. Switch 25 is fed by a speed signal from sensor 22 and a signal from limiter 17 and utilizes these input signals to activate test signal generator 26 at specified engine speeds and only when limiter 17 is limiting fuel flow. Continuous operation of generator 26 is not desirable because, as will be explained infra, the output of this generator causes the fuel flow to vary thereby causing rough operation of engine 13, and of course this rough operation is undesirable. It is not necessary that switch 25 operate generator 26 at different engine speeds; this operation could be just as well performed at selected time intervals, at selected positions of the throttle or upon command from the operator. Generator 26 feeds one input of mixer 21 with a four-stepped function, which is shown in the generator block. Mixer 21 combines or mixes this function with the output signal from limiter 17 and feeds the mixed signal to fuel valve 16. A stall and surge detector 27, one suitable circuit for which is described in application Serial No. 558,813, filed January 12, 1956, of John C. Sanders, and now Patent No. 2,926,524 issued March 1, 1960, utilizes the compressor inlet pressure of engine 13 to detect stall and surge of the engine. Coincidence switch network 28 has two inputs, one of which is fed a signal from detector 27 only upon the occurrence of stall in engine 13, and the other input of which is fed a two-valued signal from generator 26 that has one value during the highest step of the afore-mentioned four-valued function and which has the other value at all other times. Coincidence switch network 28 emits a "step up," a "step down," or a "no change" signal, depending upon the combination of the two input signals. If the afore-mentioned "other value" signal is being received from generator 26, and a stall signal is received from detector 27, a "step down" signal is produced on the output from coincidence switch network 28. If the "one value" signal is generated by generator 26, it signifies that engine 13 is receiving the high test fuel flow that should produce surge or stall. If at this time no surge or stall signal is received from detector 27, a "step up" signal is produced on the output of network 28. For all other combinations of input signals to coincidence switch network 28, a zero or "no change" signal is produced. Stepping circuit 29, which is fed by the output signal from network 28 emits a continuous signal that is combined by multiplier 19 with the surge and stall limit schedule from schedule circuit 18 in such a way that an increase in signal from stepping circuit 29 raises the scheduled output from multiplier 19 and a decrease in signal reduces this schedule. When stepping circuit 29 is not receiving a signal from coincidence switch network 28, it emits a steady signal at the level produced by the last change. Thus, the schedule control from circuit 18 operates at the adjustment last made by stepping circuit 29 until another adjustment is made. Multiplier 19, it is thus seen, performs a mixing action as well as a multiplying action. Multiplier 19 could be an adder circuit as well, but then would require subsequent amplifying stages.

Figure 2:
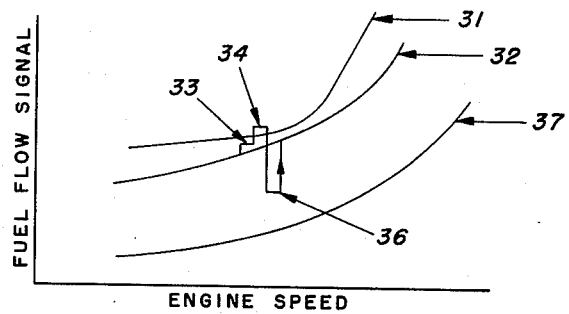
Fig. 2 is a graph of the operation of the system of Fig. 1.

The plot or graph shown in Fig. 2 shows fuel flow signal values along the ordinate axes and engine speed values along the abscissa axis. Curve 31 is a representation of the actual stall and surge limit for various values of fuel flow and engine speed for engine 13. Although curve 31 is shown to be fixed, in practice it changes considerably with changes in environmental conditions, etc., of engine 13. Curve 32 is a representation of the schedule set by circuit 18. The four-valued function shown on curve 32 and having steps 33, 34, and 36 is the function that is fed to mixer 21 from generator 26. Curve 37 represents the steady state fuel requirement of engine 13.

In the control system shown in Fig. 1, the schedule established by circuit 18 is set slightly below the minimum fuel flow required to force engine 13 into stall or surge. When the throttle is advanced, establishing immediately a higher set speed, calculator 14 sends a signal to fuel valve 16 for a higher fuel flow. However, limiter 17 prevents this signal from calculator 14 from exceeding predetermined values set into schedule circuit 18, and engine 13 accelerates around the schedule. At selected speeds or time intervals, a test signal from generator 26 is superimposed upon this schedule signal. As is shown in Fig. 2, the test signal is a succession of four steps, although it is to be realized that another testing signal could be used. The first step 33 (e.g. 10 percent increase above the schedule) is utilized to ascertain if the schedule from circuit 18 is dangerously close to a stall or surge condition for engine 13. The second step 34 tests to determine if the schedule is not unnecessarily far below the stall or surge limit and is not thereby causing a loss in acceleration. The third step 36 is down far enough to pull engine 13 out of surge, and the fourth step returns the fuel flow to the schedule. The time consumed in making the four steps is between 0.1 and 0.5 seconds, depending upon engine characteristics. As previously mentioned the control circuit 11 above broken line 24 can be any one of a number of conventional acceleration controls normally used and thus need not be described in detail. The particular acceleration control system 11, that is shown, has a schedule of fuel flow as a function of engine speed, and was chosen only for illustration. It is to be realized that other schedules could be used as for example: fuel flow against compressor discharge pressure, fuel flow against compressor pressure rise, or fuel flow against compressor pressure ratio. The new units, shown below line 24, could also be used with indirect schedules, such as turbine gas temperature against speed, compressor discharge pressure against engine speed, acceleration against speed, or air flow vector sense, such as the quotient of compressor exit velocity divided by rotor speed, as a function of engine speed. The mixing of the test signal from generator 26 with the schedule in mixer 21 will result in a varying engine speed and may result in stall or surge of engine 13. If a stall or surge condition of engine 13 occurs during step 34, detector 27 feeds a signal to network 28. However, network 28 does not produce an output signal to change the schedule because this stall or surge condition is desired during the occurrence of step 34 for it indicates that the schedule is not too far below the stall and surge limit 31. If detector 27 produces an output at any time other than during the occurrence of step 34, coincidence network 28 generates a "step down" signal that is fed through circuit 29 to multiplier 19 to lower the schedule that is fed to limiter 17. If there is no stall or surge condition simultaneous with step 34, coincidence network 28 generates a "step up" signal to readjust the schedule curve 32 closer to the stall and surge curve 31. If there is no stall or surge at a time other than during the occurrence of step 34, there is no output from network 28 to readjust the schedule since the schedule is then optimum. It is thus seen that the present acceleration control system changes the engine fuel flow at periodic intervals, or at other desired times, and detects the presence of stall or surge during the testing period, and utilizes the knowledge of the characteristics of the test signal and of the presence or absence of a stall or surge condition to readjust the schedule of an acceleration schedule control circuit so as to obtain maximum acceleration from a gas engine.

Figure 3:
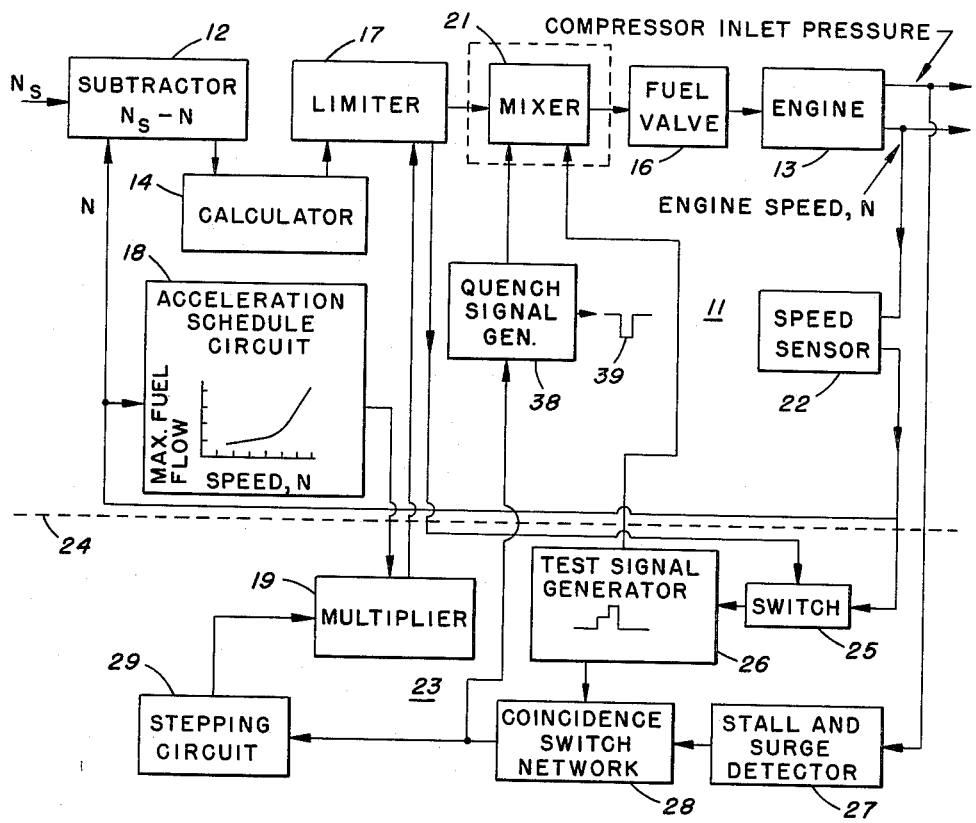
Fig. 3 shows a block diagram of another embodiment of the invention.

The embodiment of the invention disclosed in Fig. 3 incorporates the basic ideas of the system of Fig. 1 with the exception that the stall recovery pulse 36 is provided even when the test signal generator 26 is not present. Only two changes in the embodiment of Fig. 1 are required to obtain the system of Fig. 3 and they are the alteration of the test signal generator 26 so that the recovery pulse 36 is not generated and the insertion of a quench signal generator 38 between the output of coincidence switch network 28 and an input to mixer 21.

The wave form generated by test signal generator 26 of Fig. 3 is shown in the block of generator 26 and comprises only the two pulses 33 and 34. As previously mentioned each time stall or surge is encountered other than during the occurrence of pulse 34 the stepping circuit 29 reduces the schedule a small amount. However, in some engines a large reduction in fuel flow is needed before establishing the schedule at slightly below the original value. This was the reason for the inclusion of the step-down pulse 36 of the test signal generator of Fig. 1. But in some engines it may be necessary to provide a pulse similar to pulse 36 when a stall and surge condition exists regardless of whether a test signal is being generated by test signal generator 26 and thus in Fig. 3 quench signal generator 38 was added to provide pulse 39 which is a quench pulse that provides a sudden step-down for a short interval of time, for example, 0.1 second, and a step back up to be 0. The provision of this quench pulse is an added safety factor inasmuch as it protects the engine in the event that surge or stall is encountered at some other time than when the test signal is present. This recovery quench pulse is conducted directly to mixer 21 where it is combined with signals from limiter 21 and test signal generator 26. The remainder of the circuitry of Fig. 3 is the same as shown in Fig. 1 and functions identically the same.

There are well known circuits for performing the operations of the block diagram components of Figs. 1 and 3 and some of these circuits have been already mentioned. The test signal generator 26 could be comprised entirely of "flip-flop" circuits (Eccles-Jordan multivibrator), which produce the steps 33, 34, and 36 after being triggered by a pulse or signal from switch 25. A "flip-flop" circuit could also be used to generate the signal from generator 26 that is transmitted to network 28. Generator 26 could also comprise a plurality of voltage sources each of which has a voltage corresponding to a different step and a stepping relay which picks off the various voltages one at a time; of course there are many other circuits that would be suitable for generator 26. Coincidence switch network 28 could comprise a relay tree (a plural contact relay or relays having a plurality of energized and de-energized conditions), which produces specified two-valued output signals corresponding to combinations of simultaneous two-valued input signals; the science and technology of designing such relay trees is well established and used by control designers. Speed sensor 22 could comprise a tachometer generator. Multiplier 19 may comprise any suitable multiplier circuit. Several suitable circuits are described, for example, in "Thirty-One Ways to Multiply," Control Engineering, vol. 1, No. 3, pp. 36–46. Switch 25 may be any appropriate "and" circuit. See, for example, Analog Methods in Computation and Simulation, Walter W. Soroka, McGraw-Hill Book Co., Inc., New York, 1954. Stepping circuit 29 could comprise a potentiometer circuit having a coil energized by a "step up" or "step down" signal from network 28 for moving the potentiometer arm to provide an output signal which is fed to multiplier 19. Although the block diagram components have been described as being electrical in nature, it is to be realized that these block diagram components could be hydraulic, pneumatic, or mechanical. Specific electronic, hydraulic, pneumatic, and mechanical components for preforming the same operations can be found in many servomechanism text books. See, for example, application Serial No. 547,052, filed November 15, 1955, of John C. Sanders; Servomechanisms, Gordon S. Brown and Donald P. Campbell, John Wiley and Sons Inc., New York, 1948; and Electro-Mechanical Transducers and Wave Filters, Warren P. Mason, Van Nostrand Co., New York, 1942.

The present system can be operated in many modes, and can also be simplified by omitting some of its functions, the choice depending upon the individual engine 13. The system shown in Fig. 1 is particularly adapted to engines showing "hard stall" and a knee in the surge fuel flow schedule that leaves only a small acceleration margin above the steady state fuel requirements.

If a complete schedule is used, the present system would serve to compensate for differences in engine installations, variations among successive engines from the production line, and gradual engine deterioration. In this case the function of raising the schedule may be omitted. Furthermore, the test signal could be omitted; then, each time surge is encountered the schedule is lowered slightly. However, if the test signal is omitted a quench generator such as 38 of Fig. 3 should be included in some installations inasmuch as in some engines a large reduction in fuel flow is needed before establishing the schedule at slightly below the original value.

It is thus seen that the present invention has utility with a scheduled acceleration control system for a gas engine and has the capability of lowering the schedule when stall and surge are encountered, it also tests to determine if the schedule is too close or to far from the surge and stall limit of the engine, and has the capability of raising the schedule if it is too far from this limit and of lowering the schedule if it is too close to this limit. A stall and surge detector is employed in a control loop in a manner such that when stall or surge is encountered the fuel flow to the engine is manipulated to permit recovery from stall and surge and correction is made to the schedule to reduce the probability of subsequently encountering stall and surge except during intentional tests.

Obviously many modifications and variations of the present invention are possible in the light of the above teachings. It is therefore to be understood that within the scope of the appended claim the invention may be practiced otherwise than as specifically described.

What is claimed is:

An acceleration control system for obtaining maximum acceleration from a gas turbine engine upon demand, said system comprising: a speed sensor connected to produce a speed signal that is the function of the speed of said engine; a fuel valve for controlling the flow of fuel to said engine; command signal means responsive to said speed signal and a command speed signal for producing a fuel valve control signal for controlling said fuel valve to change the fuel flow to said engine to cause the engine speed to correspond to said command signal; an acceleration schedule circuit responsive to said speed signal for producing a fuel flow signal at each speed of said engine; signal modifying means having a first input terminal and a second input terminal for producing an output signal that is a function of the signal fed to said second input terminal as modified by a signal on said first input terminal; a lead for connecting the output of said acceleration schedule circuit to said second input terminal of said signal modifying means; a limiter that is fed by the outputs of said command signal means and said signal modifying means for providing a limited output of said command signal means by the output of said signal modifying means; a mixer having a first input terminal and a second input terminal for producing a mixed output signal of the signals fed to said first input terminal and said second input terminal; means for connecting the limited output of said command signal to said first input terminal of said mixer; a lead for connecting said mixer output to said fuel valve; a switch responsive to the output signal from said limiter for producing an output trigger pulse when said limiter is limiting the signal from said command signal means; a test signal generator having a first output terminal and a second output terminal and responsive to said trigger pulse from said switch for producing a four-valued step function on said first output terminal comprising four consecutive steps having, respectively, a first positive value, a second positive value greater than said first positive value, a third negative value, and a zero value, and for producing a two-valued signal on said second output terminal having one value during said second positive value of said four-valued function and having another value at all other times; a lead for connecting said first output terminal of said test signal generator to said second input terminal of said mixer; a stall and surge detector connected to said engine for producing an output signal only when said engine is in a stall or surge condition; and means fed by said two-valued signal from said test signal generator and the output of said stall and surge detector for feeding a signal to said first input terminal of said signal modifying means for causing the signal fed to said limiter from said signal modifying means to raise the limited fuel flow value when there is no signal from said stall and surge detector for either value of said two-valued signal from said test signal generator, for lowering the fuel flow limited signal when there is a signal from said stall and surge detector for said another value of said two-valued signal from said test signal generator, and for producing no change in the limited fuel flow signal for all other combinations of signals from said test signal generator and said stall and surge detector.

References Cited in the file of this patent

UNITED STATES PATENTS

| | | |
|---|---|---|
| 2,720,751 | Kunz | Oct. 18, 1955 |
| 2,738,644 | Alford | Mar. 20, 1956 |
| 2,842,108 | Sanders | July 28, 1958 |